(12) United States Patent
Wang et al.

(10) Patent No.: US 10,740,271 B2
(45) Date of Patent: Aug. 11, 2020

(54) CONNECTING APPARATUS AND SYSTEM

(71) Applicant: Huawei Technologies Co., Ltd., Shenzhen (CN)

(72) Inventors: Chongyang Wang, Beijing (CN); Jun Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 265 days.

(21) Appl. No.: 14/670,821

(22) Filed: Mar. 27, 2015

(65) Prior Publication Data
US 2015/0212963 A1 Jul. 30, 2015

Related U.S. Application Data

(63) Continuation of application No. PCT/CN2013/073046, filed on Mar. 22, 2013.

(30) Foreign Application Priority Data

Sep. 29, 2012 (CN) .......................... 2012 1 0375118

(51) Int. Cl.
*G06F 13/40* (2006.01)
*H04L 12/931* (2013.01)
*G06F 13/42* (2006.01)
(52) U.S. Cl.
CPC ...... *G06F 13/4022* (2013.01); *G06F 13/4068* (2013.01); *G06F 13/4282* (2013.01); *H04L 49/40* (2013.01)

(58) Field of Classification Search
CPC ............ G06F 13/4022; G06F 13/4068; G06F 13/4282; H04L 49/40
See application file for complete search history.

(56) References Cited

U.S. PATENT DOCUMENTS

| 8,208,253 B1* | 6/2012 | Goergen | .............. | H05K 7/1445 342/175 |
| 8,749,986 B1* | 6/2014 | Peterson | ................ | H05K 1/117 174/254 |

(Continued)

FOREIGN PATENT DOCUMENTS

| CN | 101877932 A | 11/2010 |
| CN | 101984599 A | 3/2011 |

(Continued)

*Primary Examiner* — Tim T Vo
*Assistant Examiner* — Herve Iradukunda
(74) *Attorney, Agent, or Firm* — Slater Matsil, LLP

(57) ABSTRACT

Embodiments of the present invention provide a connecting apparatus and a system. The connecting apparatus includes N interconnection units, M line processing units, and X switch processing units, where each interconnection unit is connected to at least one switch processing unit, each switch processing unit is connected to only one interconnection unit, each interconnection unit is connected to the M line processing units, each line processing unit is connected to the N interconnection units, M is a positive integer, N is a positive integer, and X is greater than or equal to N. In addition, the embodiments of the present invention further provide another connecting apparatus and system. According to the foregoing technical solutions, a connecting mode between an LPU and an SPU is relatively flexible.

20 Claims, 9 Drawing Sheets

(56) References Cited

U.S. PATENT DOCUMENTS

| | | | |
|---|---|---|---|
| 2002/0046878 A1 | 4/2002 | Uzuka et al. | |
| 2003/0039014 A1* | 2/2003 | English | H04B 10/801 398/164 |
| 2004/0252451 A1* | 12/2004 | Wilson | G06F 1/18 361/679.21 |
| 2004/0253842 A1* | 12/2004 | Barsun | H05K 7/1439 439/59 |
| 2007/0110088 A1* | 5/2007 | Kemp | H04L 49/1515 370/419 |
| 2007/0232089 A1* | 10/2007 | Fung | H05K 1/14 439/65 |
| 2008/0055847 A1* | 3/2008 | Belady | H05K 1/14 361/679.49 |
| 2008/0124025 A1* | 5/2008 | Bozso | G02B 6/12004 385/31 |
| 2008/0314979 A1* | 12/2008 | Johnsen | G06F 11/30 235/385 |
| 2009/0016336 A1* | 1/2009 | LaVigne | H04L 47/10 370/389 |
| 2009/0245135 A1* | 10/2009 | Huang | H04L 49/352 370/254 |
| 2011/0007470 A1* | 1/2011 | Belady | H05K 1/14 361/679.31 |
| 2011/0202701 A1* | 8/2011 | Maitra | G06F 13/4022 710/308 |
| 2012/0257618 A1* | 10/2012 | Pan | H04L 49/40 370/355 |
| 2013/0107489 A1 | 5/2013 | Wen et al. | |

FOREIGN PATENT DOCUMENTS

| | | |
|---|---|---|
| CN | 102681618 A | 9/2012 |
| CN | 102946364 A | 2/2013 |
| EP | 2568537 A1 | 3/2013 |
| JP | 2004253957 A | 9/2004 |
| JP | 2005150776 A | 6/2005 |
| WO | 2011137828 A1 | 11/2011 |

* cited by examiner

CONNECTING APPARATUS AND SYSTEM

This application is a continuation of International Application No. PCT/CN2013/073046, filed on Mar. 22, 2013, which claims priority to Chinese Patent Application No. 201210375118.3, filed on Sep. 29, 2012, both of which are hereby incorporated by reference in their entireties.

TECHNICAL FIELD

The present invention relates to the field of electronics, and in particular to a connecting apparatus and a system.

BACKGROUND

Some communications devices, such as a router, include line processing units (LPU) and switch processing units (SPU). In the prior art, an LPU and an SPU in a communications device are connected by using a printed circuit board (PCB) serving as a backplane. The LPU is capable of communicating with the SPU through the backplane. FIG. 1 is a schematic structural diagram of a connecting apparatus provided in the prior art. Referring to FIG. 1, multiple boards are borne on a backplane. The multiple boards shown in FIG. 1 may be LPUs. The backplane shown in FIG. 1 may be a printed circuit board. In the foregoing technical solution, a connecting mode between an LPU and an SPU is not flexible enough.

SUMMARY

To improve flexibility of a connecting mode between an LPU and an SPU, embodiments of the present invention provide a connecting apparatus and a system.

A first aspect provides a connecting apparatus, where the connecting apparatus includes N interconnection units, M line processing units, and X switch processing units, each interconnection unit is connected to at least one switch processing unit, each switch processing unit is connected to only one interconnection unit, each interconnection unit is connected to the M line processing units, each line processing unit is connected to the N interconnection units, M is a positive integer, N is a positive integer, and X is greater than or equal to N.

It can be seen from the foregoing technical solution that the M LPUs are connected to the X SPUs by using the N interconnection units. Each interconnection unit is connected to at least one switch processing unit, each switch processing unit is connected to only one interconnection unit, each interconnection unit is connected to the M line processing units, and each line processing unit is connected to the N interconnection units, where M is a positive integer, N is a positive integer, and X is greater than or equal to N. Therefore, in the foregoing technical solution, a connecting mode between an LPU and an SPU is relatively flexible.

In a first possible implementation manner of the connecting apparatus provided in the first aspect, each interconnection unit is detachably connected to the at least one switch processing unit. Each interconnection unit is detachably connected to the M line processing units.

According to the first possible implementation manner of the connecting apparatus provided in the first aspect, in a second possible implementation manner of the connecting apparatus provided in the first aspect, each interconnection unit connected to the at least one switch processing unit comprises Y first connectors, using which each interconnection unit is connected to Y second connectors included in Y switch processing units, where the at least one switch processing unit is the Y switch processing units, the Y second connectors are components of the Y switch processing units respectively, the first connector is coupled to the second connector, Y is a positive integer, and Y is less than or equal to X. Each interconnection unit connected to the M line processing units comprises M third connectors, using which each interconnection unit is connected to M fourth connectors included in the M line processing units, where the M fourth connectors are components of the M line processing units respectively, and the third connector is coupled to the fourth connector.

According to the connecting apparatus provided in the first aspect, the first possible implementation manner of the connecting apparatus provided in the first aspect, and the second implementation manner of the connecting apparatus provided in the first aspect, in a third possible implementation manner of the connecting apparatus provided in the first aspect, the interconnection unit includes a cable, an optical cable, and a passive printed circuit board or an active printed circuit board.

According to the third possible implementation manner of the connecting apparatus provided in the first aspect, in a fourth possible implementation manner of the connecting apparatus provided in the first aspect, if the interconnection unit includes the active printed circuit board, the active printed circuit board includes a relay component.

A second aspect provides a connecting apparatus, where the connecting apparatus includes M interconnection units, X line processing units, and N switch processing units, each interconnection unit is connected to at least one line processing unit, each line processing unit is connected to only one interconnection unit, each interconnection unit is connected to the N switch processing units, each switch processing unit is connected to the M interconnection units, M is a positive integer, X is a positive integer, N is a positive integer, and X is greater than or equal to M.

It can be seen from the foregoing technical solution that the X LPUs are connected to the N SPUs by using the M interconnection units. Each interconnection unit is connected to at least one line processing unit, each line processing unit is connected to only one interconnection unit, each interconnection unit is connected to the N switch processing units, and each switch processing unit is connected to the M interconnection units, where M is a positive integer, X is a positive integer, N is a positive integer, and X is greater than or equal to M. Therefore, in the foregoing technical solution, a connecting mode between an LPU and an SPU is relatively flexible.

In a first possible implementation manner of the connecting apparatus provided in the second aspect, each interconnection unit is detachably connected to the at least one line processing unit; and each interconnection unit is detachably connected to the N switch processing units.

According to the first possible implementation manner of the connecting apparatus provided in the second aspect, in a second possible implementation manner of the connecting apparatus provided in the second aspect, each interconnection unit connected to the at least one line processing unit comprises Y first connectors, using which each interconnection unit is connected to Y second connectors included in Y line processing units, the at least one line processing unit is the Y line processing units, the Y second connectors are components of the Y line processing units respectively, the first connector is coupled to the second connector, Y is a positive integer, and Y is less than or equal to X. Each interconnection unit connected to the N switch processing units comprises N third connectors, using which each interconnection unit is connected to N fourth connectors included in the N switch processing units, the N fourth connectors are components of the N switch processing units respectively, and the third connector is coupled to the fourth connector.

According to the connecting apparatus provided in the second aspect, the first possible implementation manner of the connecting apparatus provided in the second aspect, and the second implementation manner of the connecting apparatus provided in the second aspect, in a third possible implementation of the connecting apparatus provided in the second aspect, the interconnection unit includes a cable, an optical cable, and a passive printed circuit board or an active printed circuit board.

According to the third possible implementation manner of the connecting apparatus provided in the second aspect, in a fourth possible implementation manner of the connecting apparatus provided in the second aspect, if the interconnection unit includes the active printed circuit board, the active printed circuit board includes a relay component.

A third aspect provides a system, where the system includes the connecting apparatus provided in the first aspect, the first possible implementation manner of the connecting apparatus provided in the first aspect, the second possible implementation manner of the connecting apparatus provided in the first aspect, the third possible implementation manner of the connecting apparatus provided in the first aspect, the fourth possible implementation manner of the connecting apparatus provided in the first aspect, the second aspect, the first possible implementation manner of the connecting apparatus provided in the second aspect, the second possible implementation manner of the connecting apparatus provided in the second aspect, the third possible implementation manner of the connecting apparatus provided in the second aspect, or the fourth possible implementation manner of the connecting apparatus provided in the second aspect.

It can be seen from the foregoing technical solution that the X LPUs are connected to the N SPUs by using the M interconnection units. Each interconnection unit is connected to at least one line processing unit, each line processing unit is connected to only one interconnection unit, each interconnection unit is connected to the N switch processing units, and each switch processing unit is connected to the M interconnection units, where M is a positive integer, X is a positive integer, N is a positive integer, and X is greater than or equal to M. Therefore, in the foregoing technical solution, a connecting mode between an LPU and an SPU is relatively flexible.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A first embodiment of the present invention provides a connecting apparatus, where the connecting apparatus includes N interconnection units, M line processing units, and X switch processing units. Each interconnection unit is connected to at least one switch processing unit, each switch processing unit is connected to only one interconnection unit, each interconnection unit is connected to the M line processing units, each line processing unit is connected to the N interconnection units, M is a positive integer, N is a positive integer, and X is greater than or equal to N.

The following describes examples of connection relationships of the connecting apparatus provided in the first embodiment of the present invention.

A connection relationship of the connecting apparatus provided in the first embodiment of the present invention may be a first connection relationship. The first connection relationship is: each interconnection unit is directly connected to the at least one switch processing unit; and each interconnection unit is directly connected to the M line processing units.

Figure 1:
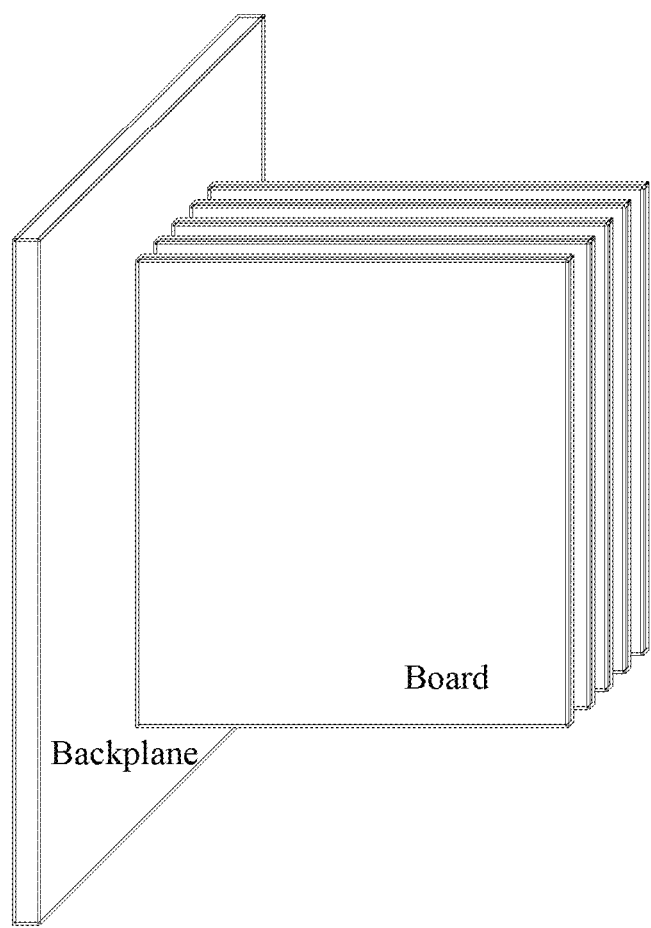
FIG. 1 is a schematic structural diagram of a connecting apparatus according to the prior art.
Figure 2:
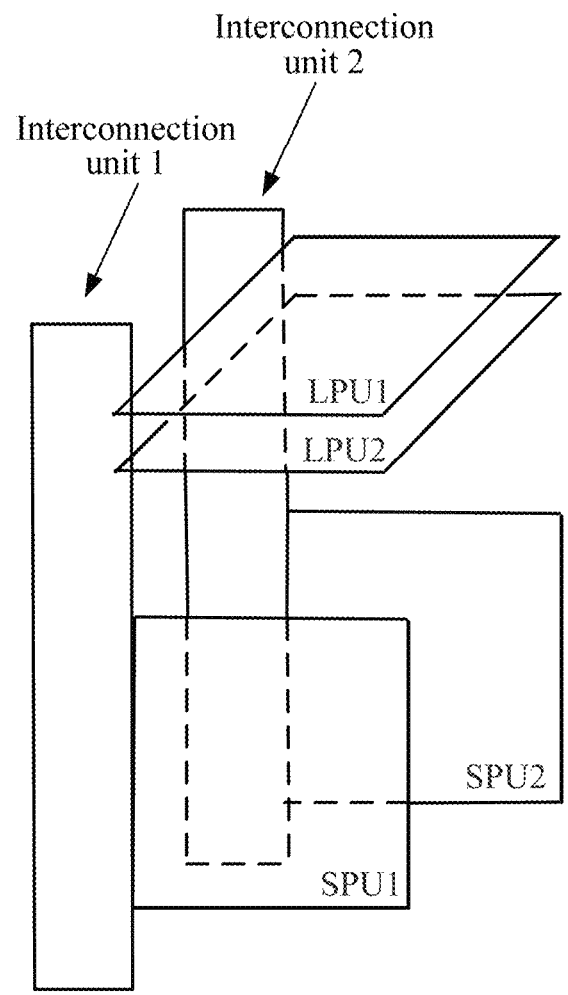
FIG. 2 is a schematic structural diagram of a connecting apparatus according to an embodiment of the present invention.

FIG. 2 is a schematic structural diagram of a connecting apparatus. For the first connection relationship, reference may be made to the connecting apparatus shown in FIG. 2.

In addition, a connection relationship of the connecting apparatus provided in the first embodiment of the present invention may be a second connection relationship. The second connection relationship is as follows. Each interconnection unit is connected to the at least one switch processing unit by using a printed circuit board, where the printed circuit board is directly connected to each interconnection unit and the printed circuit board is directly connected to the at least one switch processing unit. Each interconnection unit is connected to the M line processing units by using a printed circuit board, where the printed circuit board is directly connected to each interconnection unit and the printed circuit board is directly connected to the M line processing units.

Figure 3:
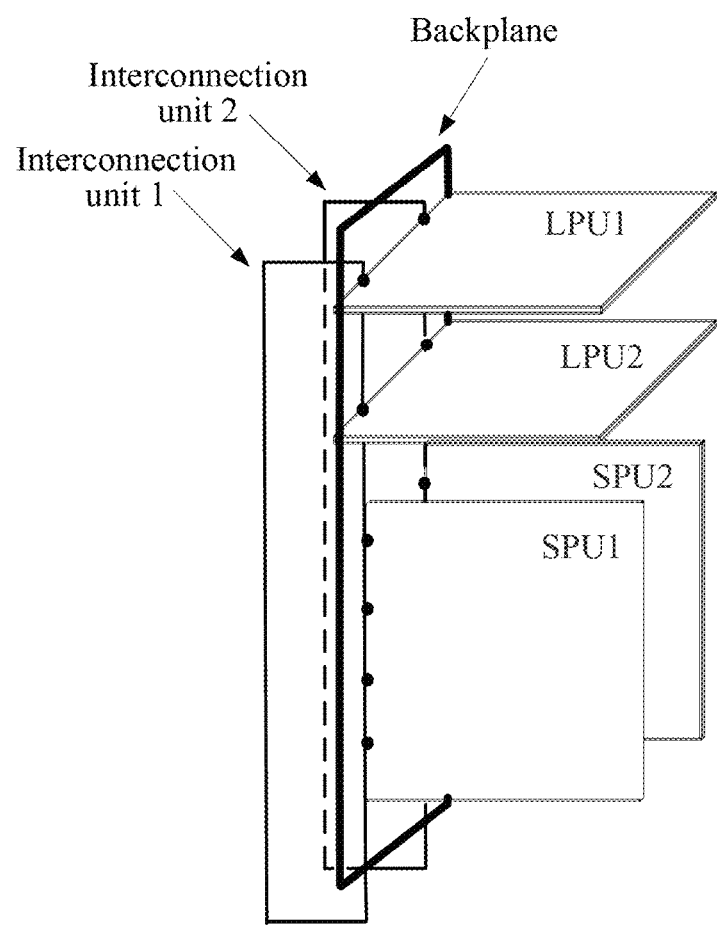
FIG. 3 is a schematic structural diagram of a connecting apparatus according to an embodiment of the present invention.

FIG. 3 is a schematic structural diagram of a connecting apparatus. For the second connection relationship, reference may be made to the connecting apparatus shown in FIG. 3.

The following describes in detail the first connection relationship in combination with FIG. 2.

Referring to FIG. 2, a connection relationship between an LPU and an interconnection unit is as follows:

An LPU1 is directly connected to an interconnection unit 1. The LPU1 is directly connected to an interconnection unit 2. An LPU2 is directly connected to the interconnection unit 1. The LPU2 is directly connected to the interconnection unit 2.

A connection relationship between an SPU and the interconnection unit is as follows.

An SPU1 is directly connected to the interconnection unit 1. An SPU2 is directly connected to the interconnection unit 2.

The following describes in detail the second connection relationship in combination with FIG. 3.

Referring to FIG. 3, in the connecting apparatus shown in FIG. 3, X, M, and N are all 2. The connecting apparatus includes two interconnection units, two LPUs, and two SPUs. The two interconnection units are an interconnection unit 1 and an interconnection unit 2. The two LPUs are an LPU1 and an LPU2. The two SPUs are an SPU1 and an SPU2. In addition, the connecting apparatus shown in FIG. 3 further includes a backplane, where the backplane is a printed circuit board. It should be noted that the backplane shown in FIG. 3 is drawn transparently so as to describe a connection relationship between an LPU and an interconnection unit and a connection relationship between an SPU and the interconnection unit more clearly.

Referring to FIG. 3, the connection relationship between the LPU and the interconnection unit is as follows.

The LPU1 is connected to the interconnection unit 1 by using the printed circuit board, where the printed circuit board is directly connected to the LPU1 and the printed circuit board is directly connected to the interconnection unit 1. The LPU1 is connected to the interconnection unit 2 by using the printed circuit board, where the printed circuit board is directly connected to the LPU1 and the printed circuit board is directly connected to the interconnection unit 2. The LPU2 is connected to the interconnection unit 1 by using the printed circuit board, where the printed circuit board is directly connected to the LPU2 and the printed circuit board is directly connected to the interconnection unit 1. The LPU2 is connected to the interconnection unit 2 by using the printed circuit board, where the printed circuit board is directly connected to the LPU2 and the printed circuit board is directly connected to the interconnection unit 2.

The connection relationship between the SPU and the interconnection unit is as follows.

The SPU1 is connected to the interconnection unit 1 by using the printed circuit board, where the printed circuit board is directly connected to the SPU1 and the printed circuit board is directly connected to the interconnection unit 1. The SPU2 is connected to the interconnection unit 2 by using the printed circuit board, where the printed circuit board is directly connected to the SPU2 and the printed circuit board is directly connected to the interconnection unit 2.

The following describes examples of the number of the line processing units, the number of the switch processing units, and the number of the interconnection units of the connecting apparatus provided in the first embodiment of the present invention. For example, X, M, and N are all equal to 1; and for example, X, M, and N are all greater than 1.

The following describes in detail the number of the line processing units, the number of the switch processing units, and the number of the interconnection units of the connecting apparatus provided in the first embodiment of the present invention in combination with FIG. 2.

Referring to FIG. 2, in the connecting apparatus shown in FIG. 2, X, M, and N are all 2. The connecting apparatus includes two interconnection units, two LPUs, and two SPUs. The two interconnection units are the interconnection unit 1 and the interconnection unit 2. The two LPUs are the LPU1 and the LPU2. The two SPUs are the SPU1 and the SPU2.

The following describes examples of an attribute of the connection relationship of the connecting apparatus provided in the first embodiment of the present invention.

The connection relationship of the connecting apparatus provided in the first embodiment of the present invention may be an optical connection. Specifically, each interconnection unit is optically connected to the at least one switch processing unit, and each interconnection unit is optically connected to the M line processing units.

The connection relationship of the connecting apparatus provided in the first embodiment of the present invention may be an electrical connection. Specifically, each interconnection unit is electrically connected to the at least one switch processing unit, and each interconnection unit is electrically connected to the M line processing units.

Alternatively, in the connecting apparatus provided in the first embodiment of the present invention, each interconnection unit is detachably connected to the at least one switch processing unit. Each interconnection unit is detachably connected to the M line processing units.

Alternatively, in the connecting apparatus provided in the first embodiment of the present invention, that each interconnection unit is connected to the at least one switch processing unit is specifically described as follows. Each interconnection unit includes Y first connectors, by means of which each interconnection unit is connected to Y second connectors included in Y switch processing units. The at least one switch processing unit is the Y switch processing units, the Y second connectors are components of the Y switch processing units respectively, the first connector is coupled to the second connector, Y is a positive integer, and Y is less than or equal to X. Further, each interconnection unit is connected to the M line processing units is specifically described as follows. Each interconnection unit includes M third connectors, by means of which each interconnection unit is connected to M fourth connectors included in the M line processing units, where the M fourth connectors are components of the M line processing units respectively, and the third connector is coupled to the fourth connector.

It should be noted that the first connector refers to a connector that is in the interconnection unit and configured to connect to the switch processing unit. The first connector is a component of the interconnection unit. Persons skilled in the art should understand that the first connector refers to a connector of a certain type, instead of a certain connector.

The second connector refers to a connector that is in the switch processing unit and configured to connect to the interconnection unit. The second connector is a component of the switch processing unit. Persons skilled in the art should understand that the second connector refers to a connector of a certain type, instead of a certain connector.

The third connector refers to a connector that is in the interconnection unit and configured to connect to the line processing unit. The third connector is a component of the interconnection unit. Persons skilled in the art should understand that the third connector refers to a connector of a certain type, instead of a certain connector.

The fourth connector refers to a connector that is in the line processing unit and configured to connect to the interconnection unit. The fourth connector is a component of the line processing unit. Persons skilled in the art should understand that the fourth connector refers to a connector of a certain type, instead of a certain connector.

That the first connector is coupled to the second connector means that the first connector is directly connected to the second connector. That the third connector is coupled to the fourth connector means that the third connector is directly connected to the fourth connector.

If the first connector is a male connector, the second connector may be a female connector corresponding to the male connector. If the first connector is a female connector, the second connector may be a male connector corresponding to the female connector.

Alternatively, in the connecting apparatus provided in the first embodiment of the present invention, the interconnection unit includes a cable, an optical cable, and a passive printed circuit board or an active printed circuit board.

Figure 4:
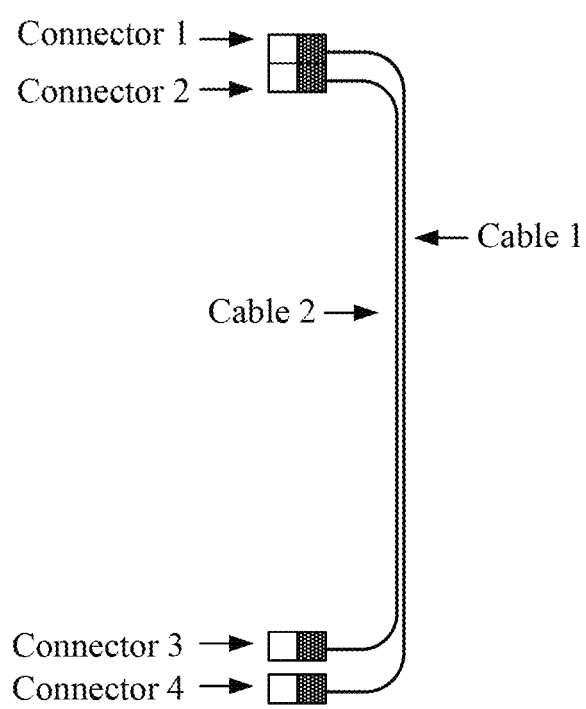
FIG. 4 is a schematic structural diagram of an interconnection unit according to an embodiment of the present invention.

FIG. 4 is a schematic diagram of an interconnection unit. Referring to FIG. 4, the interconnection unit includes a connector 1, a connector 2, a connector 3, a connector 4, a cable 1, and a cable 2. The cable 1 is directly connected to the connector 1. The cable 1 is directly connected to the connector 4. The cable 2 is directly connected to the connector 2. The cable 2 is directly connected to the connector 3. The interconnection unit shown in FIG. 4 may be applied in the connecting apparatus shown in FIG. 2. For example, the interconnection unit shown in FIG. 4 may be the interconnection unit 1 shown in FIG. 2. Specifically, the connector 1 may be configured to connect to the LPU1, the connector 2 may be configured to connect to the LPU2, the connector 3 may be configured to connect to the SPU1, and the connector 4 may be configured to connect to the SPU1. Persons skilled in the art should understand that the interconnection unit shown in FIG. 4 may not include the connector 1, the connector 2, the connector 3, and the connector 4. In a scenario where the interconnection unit shown in FIG. 4 includes no connector, the upper part of the cable 1 may be welded to the LPU1, the upper part of the cable 2 may be welded to the LPU2, the lower part of the cable 1 may be welded to the SPU1, and the lower part of the cable 2 may be welded to the SPU1.

Alternatively, in the connecting apparatus provided in the first embodiment of the present invention, if the interconnection unit includes the active printed circuit board, the active printed circuit board includes a relay component.

Figure 5:
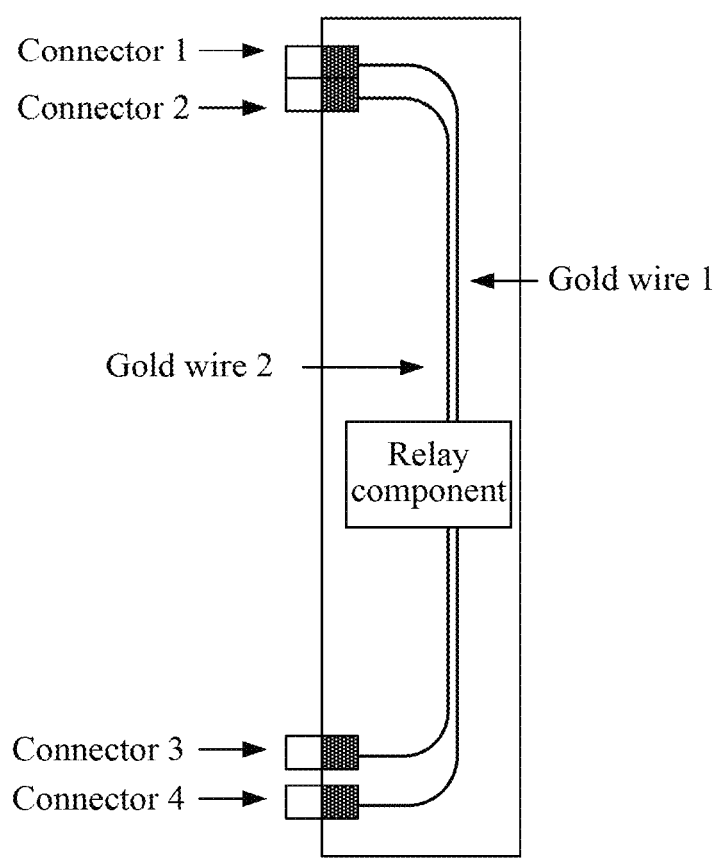
FIG. 5 is a schematic structural diagram of an interconnection unit according to an embodiment of the present invention.

FIG. 5 is a schematic diagram of an interconnection unit. The interconnection unit shown in FIG. 5 is an active printed circuit board. The active printed circuit board includes a connector 1, a connector 2, a connector 3, a connector 4, a gold wire 1, and a gold wire 2. A function of the interconnection unit shown in FIG. 5 is similar to a function of the interconnection unit shown in FIG. 4. The connector 1, the connector 2, the connector 3, the connector 4, the gold wire 1, and the gold wire 2 shown in FIG. 5 correspond to the connector 1, the connector 2, the connector 3, the connector 4, the cable 1, and the cable 2 shown in FIG. 4, respectively.

In addition, a relay component is arranged between the gold wire 1 and the gold wire 2. The relay component herein may be an active chip and is configured to amplify signals transmitted on the gold wire so as to reduce signal attenuation. For a specific structure of the interconnection unit shown in FIG. 5, refer to the interconnection unit shown in FIG. 4. Details are not described herein.

A second embodiment of the present invention provides a connecting apparatus, which includes: M interconnection units, X line processing units, and N switch processing units, where each interconnection unit is connected to at least one line processing unit, each line processing unit is connected to only one interconnection unit, each interconnection unit is connected to the N switch processing units, each switch processing unit is connected to the M interconnection units, M is a positive integer, X is a positive integer, N is a positive integer and X is greater than or equal to M.

The following describes examples of connection relationships of the connecting apparatus provided in the second embodiment of the present invention.

A connection relationship of the connecting apparatus provided in the second embodiment of the present invention may be a first connection relationship. The first connection relationship is described as follows. Each interconnection unit is directly connected to the at least one line processing unit; and each interconnection unit is directly connected to the N switch processing units.

Figure 6:
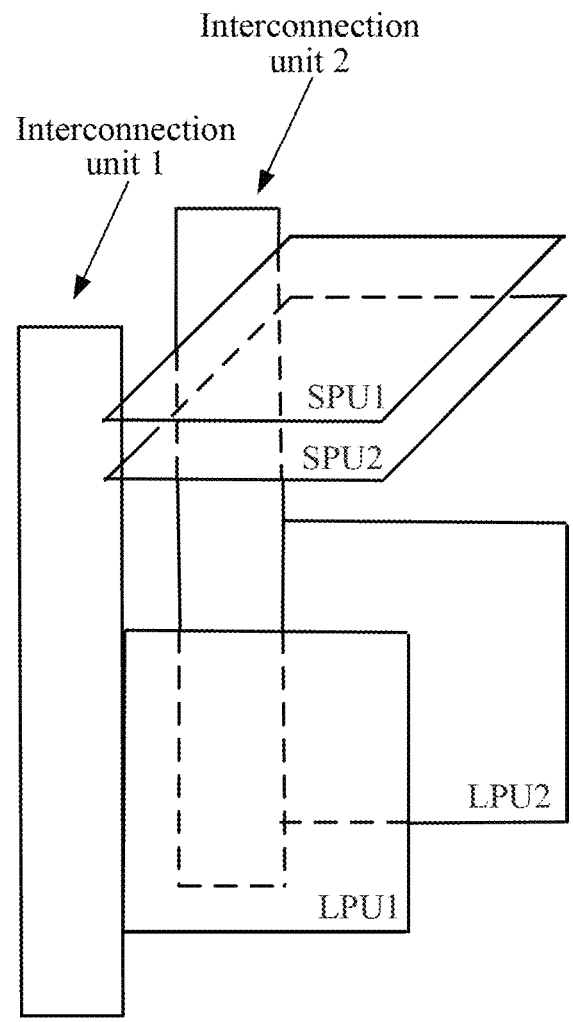
FIG. 6 is a schematic structural diagram of a connecting apparatus according to an embodiment of the present invention.

FIG. 6 is a schematic structural diagram of a connecting apparatus. For the first connection relationship, reference may be made to the connecting apparatus shown in FIG. 6.

In addition, a connection relationship of the connecting apparatus provided in the second embodiment of the present invention may be a second connection relationship. The second connection relationship is described as follows. Each interconnection unit is connected to the at least one line processing unit by using a printed circuit board, where the printed circuit board is directly connected to each interconnection unit and the printed circuit board is directly connected to the at least one line processing unit. Each interconnection unit is connected to the N switch processing units by using a printed circuit board, where the printed circuit board is directly connected to each interconnection unit, and the printed circuit board is directly connected to the N switch processing units.

Figure 7:
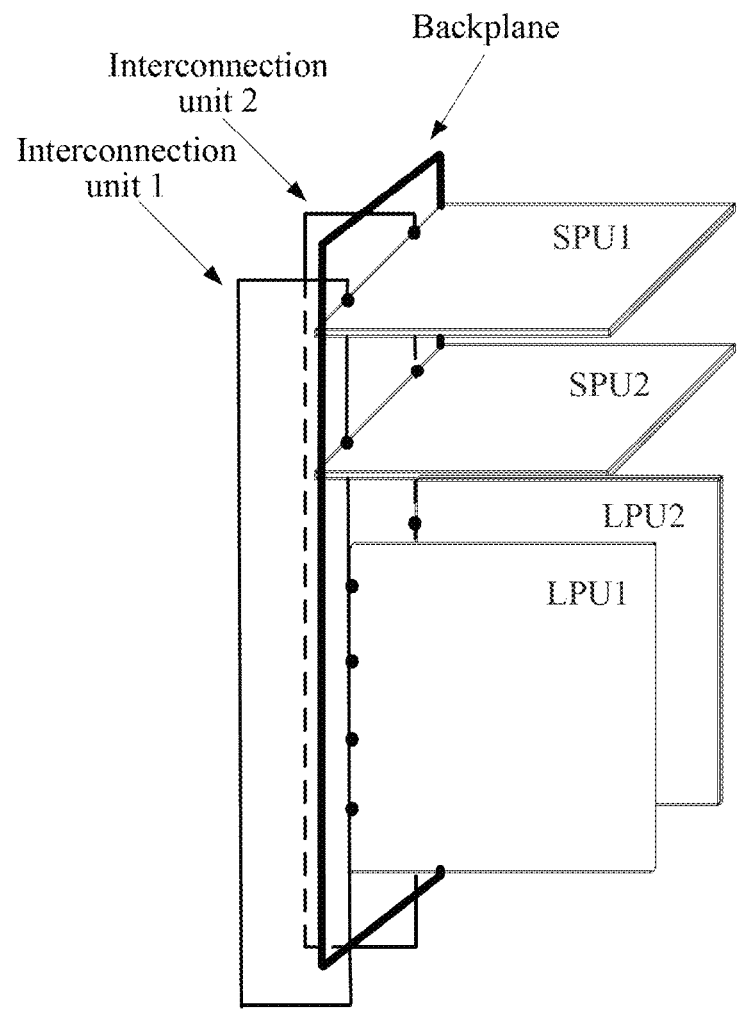
FIG. 7 is a schematic structural diagram of a connecting apparatus according to an embodiment of the present invention.

FIG. 7 is a schematic structural diagram of a connecting apparatus. For the second connection relationship, reference may be made to the connecting apparatus shown in FIG. 7.

The following describes in detail the first connection relationship in combination with FIG. 6.

Referring to FIG. 6, the connection relationship between an LPU and an interconnection unit is as follows:

An LPU1 is directly connected to an interconnection unit 1. An LPU2 is directly connected to an interconnection unit 2.

The connection relationship between an SPU and the interconnection unit is as follows.

An SPU1 is directly connected to the interconnection unit 1. The SPU1 is directly connected to the interconnection unit 2. An SPU2 is directly connected to the interconnection unit 1. The SPU2 is directly connected to the interconnection unit 2.

The following describes in detail the second connection relationship in combination with FIG. 7.

Referring to FIG. 7, in the connecting apparatus shown in FIG. 7, X, M, and N are all 2. The connecting apparatus includes two interconnection units, two LPUs, and two SPUs. The two interconnection units are an interconnection unit 1 and an interconnection unit 2. The two LPUs are an LPU1 and an LPU2. The two SPUs are an SPU1 and an SPU2. In addition, the connecting apparatus shown in FIG. 7 further includes a backplane, where the backplane is a printed circuit board. It should be noted that the backplane shown in FIG. 7 is drawn transparently so as to describe a connection relationship between an LPU and an interconnection unit and a connection relationship between an SPU and the interconnection unit more clearly.

As shown in FIG. 7, the connection relationship between the SPU and the interconnection unit is as follows.

The SPU1 is connected to the interconnection unit 1 by using the printed circuit board, where the printed circuit board is directly connected to the SPU1 and the printed circuit board is directly connected to the interconnection unit 1. The SPU1 is connected to the interconnection unit 2 by using the printed circuit board, where the printed circuit board is directly connected to the SPU1 and the printed circuit board is directly connected to the interconnection unit 2. The SPU2 is connected to the interconnection unit 1 by using the printed circuit board, where the printed circuit board is directly connected to the SPU2 and the printed circuit board is directly connected to the interconnection unit 1. The SPU2 is connected to the interconnection unit 2 by using the printed circuit board, where the printed circuit board is directly connected to the SPU2 and the printed circuit board is directly connected to the interconnection unit 2.

The connection relationship between the LPU and the interconnection unit is as follows.

The LPU1 is connected to the interconnection unit 1 by using the printed circuit board, where the printed circuit board is directly connected to the LPU1 and the printed circuit board is directly connected to the interconnection unit 1. The LPU2 is connected to the interconnection unit 2 by using the printed circuit board, where the printed circuit board is directly connected to the LPU2 and the printed circuit board is directly connected to the interconnection unit 2.

The following describes examples of the number of the line processing units, the number of the switch processing units, and the number of the interconnection units of the connecting apparatus provided in the second embodiment of the present invention: for example, X, M, and N are all equal to 1; and for example, X, M, and N are all greater than 1.

The following describes in detail the number of the line processing units, the number of the switch processing units, and the number of the interconnection units of the connecting apparatus provided in the second embodiment of the present invention in combination with FIG. 6.

Referring to FIG. 6, in the connecting apparatus shown in FIG. 6, X, M, and N are all 2. The connecting apparatus includes two interconnection units, two LPUs, and two SPUs. The two interconnection units are the interconnection unit 1 and the interconnection unit 2. The two LPUs are the LPU1 and the LPU2. The two SPUs are the SPU1 and the SPU2.

The following describes examples of an attribute of the connection relationship of the connecting apparatus provided in the second embodiment of the present invention.

The connection relationship of the connecting apparatus provided in the second embodiment of the present invention may be an optical connection. Specifically, each interconnection unit is optically connected to the at least one line processing unit, and each interconnection unit is optically connected to the N switch processing units.

The connection relationship of the connecting apparatus provided in the second embodiment of the present invention may be an electrical connection. Specifically, each interconnection unit is electrically connected to the at least one line processing unit, and each interconnection unit is electrically connected to the N switch processing units.

Alternatively, in the connecting apparatus provided in the second embodiment of the present invention, that each interconnection unit is connected to the at least one line processing unit is specifically described as follows. Each interconnection unit is detachably connected to the at least one line processing unit. Further, each interconnection unit is connected to the N switch processing units is specifically described as follows. Each interconnection unit is detachably connected to the N switch processing units.

Alternatively, in the connecting apparatus provided in the second embodiment of the present invention, that each interconnection unit is connected to the at least one line processing unit is specifically described as follows. Each interconnection unit includes Y first connectors, by means of which each interconnection unit is connected to Y second connectors included in Y line processing units, the at least one line processing unit is the Y line processing units, the Y second connectors are components of the Y line processing units respectively, the first connector is coupled to the second connector, Y is a positive integer, and Y is less than or equal to X. Further, that each interconnection unit is connected to the N switch processing units is specifically described as follows. Each interconnection unit includes N third connectors, by means of which each interconnection unit is connected to N fourth connectors included in the N switch processing units by using N third connectors included in the interconnection unit, the N fourth connectors are components of the N switch processing units respectively, and the third connector is coupled to the fourth connector.

It should be noted that the first connector refers to a connector that is in the interconnection unit and configured to connect to the line processing unit. The first connector is a component of the interconnection unit. Persons skilled in the art should understand that the first connector refers to a connector of a certain type, instead of a certain connector.

The second connector refers to a connector that is in the line processing unit and configured to connect to the interconnection unit. The second connector is a component of the line processing unit. Persons skilled in the art should understand that the second connector refers to a connector of a certain type, instead of a certain connector.

The third connector refers to a connector that is in the interconnection unit and configured to connect to the switch processing unit. The third connector is a component of the interconnection unit. Persons skilled in the art should understand that the third connector refers to a connector of a certain type, instead of a certain connector.

The fourth connector refers to a connector that is in the switch processing unit and configured to connect to the interconnection unit. The fourth connector is a component of the switch processing unit. Persons skilled in the art should understand that the fourth connector refers to a connector of a certain type, instead of a certain connector.

That the first connector is coupled to the second connector means that the first connector is directly connected to the second connector. That the third connector is coupled to the fourth connector means that the third connector is directly connected to the fourth connector.

If the first connector is a male connector, the second connector may be a female connector corresponding to the male connector. If the first connector is a female connector, the second connector may be a male connector corresponding to the female connector.

Alternatively, in the connecting apparatus provided in the second embodiment of the present invention, the interconnection unit includes a cable, an optical cable, and a passive printed circuit board or an active printed circuit board.

FIG. 4 is a schematic diagram of an interconnection unit. Referring to FIG. 4, the interconnection unit includes a connector 1, a connector 2, a connector 3, a connector 4, a cable 1, and a cable 2. The cable 1 is directly connected to the connector 1. The cable 1 is directly connected to the connector 4. The cable 2 is directly connected to the connector 2. The cable 2 is directly connected to the connector 3. The interconnection unit shown in FIG. 4 may be applied in the connecting apparatus shown in FIG. 6. For example, the interconnection unit shown in FIG. 4 may be the interconnection unit 1 shown in FIG. 6. Specifically, the connector 1 may be configured to connect to the SPU1, the connector 2 may be configured to connect to the SPU2, the connector 3 may be configured to connect to the LPU1, and the connector 4 may be configured to connect to the LPU1. Persons skilled in the art should understand that the interconnection unit shown in FIG. 4 may not include the connector 1, the connector 2, the connector 3, and the connector 4. In a scenario where the interconnection unit shown in FIG. 4 includes no connector, the upper part of the cable 1 may be welded to the SPU1, the upper part of the cable 2 may be welded to the SPU2, the lower part of the cable 1 may be welded to the LPU1, and the lower part of the cable 2 may be welded to the LPU1.

Alternatively, in the connecting apparatus provided in the second embodiment of the present invention, if the interconnection unit includes the active printed circuit board, the active printed circuit board includes a relay component.

FIG. 5 is a schematic diagram of an interconnection unit. The interconnection unit shown in FIG. 5 is an active printed circuit board. The active printed circuit board includes a connector 1, a connector 2, a connector 3, a connector 4, a gold wire 1, and a gold wire 2. A function of the interconnection unit shown in FIG. 5 is similar to a function of the interconnection unit shown in FIG. 4. The connector 1, the connector 2, the connector 3, the connector 4, the gold wire 1, and the gold wire 2 shown in FIG. 5 correspond to the connector 1, the connector 2, the connector 3, the connector 4, the cable 1, and the cable 2 shown in FIG. 4, respectively. In addition, a relay component is arranged between the gold wire 1 and the gold wire 2. The relay component herein may be an active chip, and the relay component may be configured to amplify, or shape and amplify signals, such as electric signals, transmitted on the gold wire, so as to reduce signal attenuation. For a specific structure of the interconnection unit shown in FIG. 5, refer to the interconnection unit shown in FIG. 4. Details are not described herein.

Figure 8:
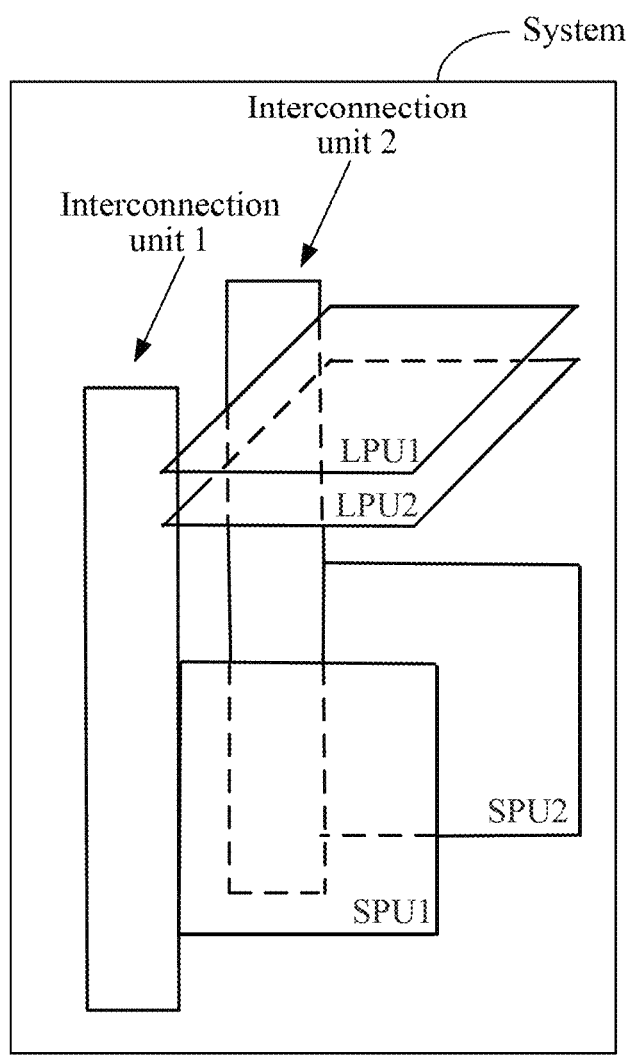
FIG. 8 is a schematic structural diagram of a system according to an embodiment of the present invention.

FIG. 8 is a schematic structural diagram of a system according to a third embodiment of the present invention. The system includes the connecting apparatus provided in the first embodiment of the present invention. The system may be a network device, and the network device may be a router.

Figure 9:
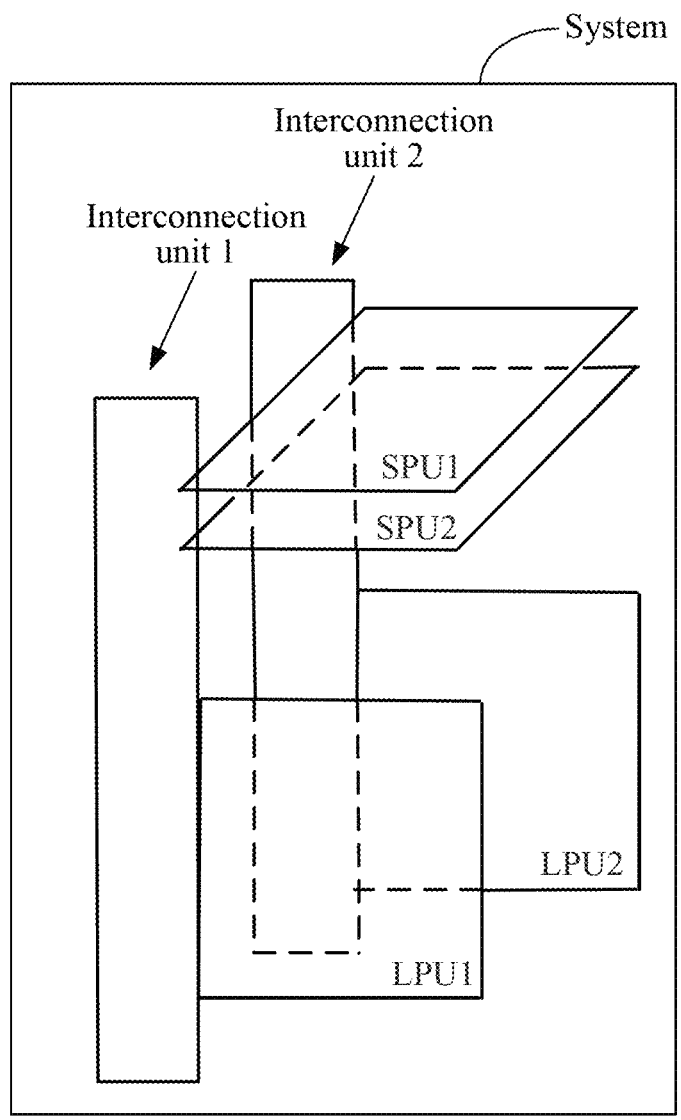
FIG. 9 is a schematic structural diagram of a system according to an embodiment of the present invention.

FIG. 9 is a schematic structural diagram of a system according to a fourth embodiment of the present invention. The system includes the connecting apparatus provided in the second embodiment of the present invention. The system may be a network device, and the network device may be a router.

The foregoing descriptions are merely specific embodiments of the present invention. It should be pointed that persons of ordinary skill in the art may make several improvements and modifications without departing from the principle of the present invention, and these improvements and modifications shall fall within the protection scope of the present invention.

What is claimed is:

1. A connecting apparatus comprising:
   N interconnection units;
   M line processing units; and
   X switch processing units,
     wherein each of the N interconnection units is entirely spatially separated from each of the remaining ones of the N interconnection units,
     wherein the M line processing units and the X switch processing units are disposed on the same side of the N interconnection units,
     wherein each interconnection unit is connected to and physically contacts exactly one corresponding switch processing unit,
     wherein each interconnection unit is disposed entirely in a plane parallel to the respective exactly one corresponding switch processing unit,
     wherein each of the X switch processing units is connected to and physically contacts exactly one corresponding interconnection unit,
     wherein each of the M line processing units is directly attached to each of the N interconnection units, and
     wherein M is a positive integer indicating the number of line processing units and is greater than one, N is a positive integer indicating the number of interconnection units and is greater than one, and X is greater than or equal to N indicating the number of switch processing units and is greater than one.

2. The connecting apparatus according to claim 1,
   wherein each interconnection unit is detachably connected to the respective exactly one corresponding switch processing unit; and
   wherein each interconnection unit is detachably connected to the M line processing units.

3. The connecting apparatus according to claim 1, wherein each of the N interconnection units comprises one of: an electrical cable; an optical cable; or a passive printed circuit board.

4. The connecting apparatus according to claim 1, wherein each of the N interconnection units comprises an active printed circuit board.

5. The connecting apparatus according to claim 4, wherein each active printed circuit board comprises a relay component.

6. The connecting apparatus according to claim 1, wherein the connecting apparatus is part of a router.

7. The connecting apparatus according to claim 1, wherein each of N, M, and X is greater than or equal to two.

8. The connecting apparatus according to claim 7, wherein each of N, M, and X is greater than two.

9. The connecting apparatus according to claim 1, wherein each of the N interconnection units is a planar printed circuit board.

10. The connecting apparatus according to claim 1, wherein:
   each of the N interconnection units comprises exactly M first connectors directly connected to M corresponding second connectors included in the M line processing units in a one-to-one ratio, M being the positive integer indicating the number of line processing units; and each of the N interconnection units further comprises X third connectors directly connected to X corresponding fourth connectors included in the respective exactly one corresponding switch processing unit, X being the positive integer indicating the number of switch processing units.

11. A connecting apparatus comprising:

M interconnection units;

X line processing units; and

N switch processing units, wherein each of the M interconnections units is entirely spatially separated from each of the remaining ones of the M interconnection units, wherein the X line processing units and the N switch processing units are disposed on the same side of the M interconnection units, wherein each interconnection unit is connected to and physically contacts exactly one corresponding line processing unit, wherein each interconnection unit is disposed in a plane parallel to the respective exactly one corresponding line processing unit, wherein each of the X line processing unit is connected to and physically contacts exactly one corresponding interconnection unit, wherein each of the N switch processing units is directly attached to each of the M interconnection units, and wherein M is a positive integer indicating the number of interconnection units and is greater than one, X is a positive integer indicating the number of line processing units and is greater than one, N is a positive integer indicating the number of switch processing units and is greater than one, and X is greater than or equal to M.

12. The connecting apparatus according to claim 11, wherein each interconnection unit is detachably connected to the respective exactly one corresponding line processing unit; and wherein each interconnection unit is detachably connected to the N switch processing units.

13. The connecting apparatus according to claim 11, wherein each of the M interconnection units comprises one of: an electrical cable; an optical cable; or a passive printed circuit board.

14. The connecting apparatus according to claim 11, wherein each of the M interconnection units comprises an active printed circuit board.

15. The connecting apparatus according to claim 14, wherein each active printed circuit board comprises a relay component.

16. The connecting apparatus according to claim 11, wherein the connecting apparatus is part of a router.

17. The connecting apparatus according to claim 11, wherein each of M, X, and N is greater than or equal to two.

18. The connecting apparatus according to claim 17, wherein each of M, X, and N is greater than two.

19. The connecting apparatus according to claim 11, wherein each of the M interconnection units is a planar printed circuit board.

20. A router, comprising:

a plurality of planar line processing units (LPUs);

a plurality of planar switch processing units (SPUs);

a plurality of planar printed circuit board interconnection units entirely spatially separated from one another;

wherein each of the plurality of planar printed circuit board interconnection units is directly connected to and physically contacts a corresponding planar SPU of the plurality of planar SPUs in a one-to-one relationship, each respective planar circuit board interconnection unit being disposed in a common plane with the corresponding planar SPU;

wherein each of the plurality of planar LPUs is directly connected to each of the plurality of planar printed circuit board interconnection units;

wherein each of the plurality of planar LPUs is disposed in a plane perpendicular to planes of the plurality of planar printed circuit board interconnection units; and wherein the plurality of planar LPUs and the plurality of planar SPUs are disposed on the same side of the plurality of planar printed circuit board interconnection units.

* * * * *